United States Patent
Rana et al.

(10) Patent No.: US 9,560,156 B1
(45) Date of Patent: Jan. 31, 2017

(54) SYSTEM AND METHOD FOR COACHING A USER ON A WEBSITE

(71) Applicant: MATCH.COM, L.L.C., Dallas, TX (US)

(72) Inventors: Manu Rana, Dallas, TX (US); Beth Wilson, Richardson, TX (US); Anthony L. Fratiani, Allen, TX (US)

(73) Assignee: MATCH.COM, L.L.C., Dallas, TX (US)

( * ) Notice: Subject to any disclaimer, the term of this patent is extended or adjusted under 35 U.S.C. 154(b) by 310 days.

(21) Appl. No.: 13/921,441

(22) Filed: Jun. 19, 2013

(51) Int. Cl.
G06F 15/16 (2006.01)
H04L 29/08 (2006.01)

(52) U.S. Cl.
CPC .................. *H04L 67/306* (2013.01)

(58) Field of Classification Search
CPC  G06Q 30/02; G06Q 30/0269; G06Q 30/0631; G06Q 30/0224; G06Q 50/01; G06Q 30/0201; G06Q 30/08; G06Q 10/1053; G06Q 30/0255; G06Q 50/10; H04L 67/306; H04L 67/12; H04L 51/32; H04L 12/588; H04L 65/403; G06F 17/30867; G06F 17/30528; G06F 17/3053; G06F 17/27; G06F 17/2785; G06F 17/30412; G06F 17/30256; G06F 21/6245; H04M 15/58; H04M 2215/74; H04M 2215/7407
See application file for complete search history.

(56) References Cited

U.S. PATENT DOCUMENTS

| | | | |
|---|---|---|---|
| 7,285,090 B2 | 10/2007 | Stivoric et al. | |
| 7,487,018 B2* | 2/2009 | Afshar | G06Q 10/06 701/29.6 |
| 7,493,372 B2* | 2/2009 | Crabtree | G06F 17/30867 379/201.02 |
| 8,095,408 B2* | 1/2012 | Schigel | G06Q 10/063 705/7.11 |
| 8,332,418 B1* | 12/2012 | Giordani | G06Q 50/01 707/706 |
| 8,566,327 B2 | 10/2013 | Carrico et al. | |
| 8,990,123 B2 | 3/2015 | Shrivastav | |
| 2003/0028498 A1* | 2/2003 | Hayes-Roth | G06N 99/005 706/17 |
| 2004/0002050 A1 | 1/2004 | Gilbert et al. | |

(Continued)

OTHER PUBLICATIONS

Unpublished U.S. Appl. No. 14/283,601, filed May 21, 2014, (72 pages).

(Continued)

*Primary Examiner* — Kevin Bates
*Assistant Examiner* — Ranjan Pant
(74) *Attorney, Agent, or Firm* — Patent Capital Group

(57) ABSTRACT

Methods and systems for coaching an end user are disclosed. Information related to a user profile and/or user activity of an end user is collected in a memory. An analysis engine analyzes information against a metric. A metric may represent or include one or more characteristics of a (typical) successful end user. Said metric may be statistically determined in various ways. A rules engine generates a coaching message for output to the end user if the information does not meet the metric, wherein the one or more coaching messages provokes (or suggests) the end user to change the user profile and/or the user activity of the end user to meet the metric.

20 Claims, 17 Drawing Sheets

(56) References Cited

U.S. PATENT DOCUMENTS

| | | | |
|---|---|---|---|
| 2004/0210661 A1* | 10/2004 | Thompson | G06Q 30/02 709/228 |
| 2006/0059159 A1* | 3/2006 | Truong | G06F 17/30861 |
| 2006/0282426 A1 | 12/2006 | Spears | |
| 2008/0155426 A1 | 6/2008 | Robertson et al. | |
| 2008/0195946 A1 | 8/2008 | Peri-Glass | |
| 2008/0288590 A1 | 11/2008 | Lynch | |
| 2009/0199113 A1 | 8/2009 | McWhinnie et al. | |
| 2009/0322597 A1 | 12/2009 | Medina-Herrero et al. | |
| 2010/0246576 A1 | 9/2010 | Bustamente | |
| 2010/0283827 A1 | 11/2010 | Bustamente | |
| 2010/0287286 A1 | 11/2010 | Bustamente | |
| 2011/0087436 A1 | 4/2011 | Klapa et al. | |
| 2011/0276507 A1* | 11/2011 | O'Malley | G06Q 10/00 705/321 |
| 2011/0313647 A1 | 12/2011 | Koebler et al. | |
| 2012/0084353 A1 | 4/2012 | Herde et al. | |
| 2012/0226991 A1* | 9/2012 | Drennan | G06Q 50/01 715/738 |
| 2012/0310427 A1* | 12/2012 | Williams | G05F 1/67 700/287 |
| 2013/0152211 A1 | 6/2013 | Wu et al. | |
| 2013/0290209 A1* | 10/2013 | Wirz | G06Q 10/1053 705/321 |
| 2014/0157171 A1 | 6/2014 | Brust et al. | |
| 2014/0172480 A1 | 6/2014 | Strickholm | |
| 2014/0214801 A1* | 7/2014 | Ciliberti, III | G06Q 10/0631 707/722 |
| 2014/0229486 A1* | 8/2014 | Kveton | G06F 17/30731 707/737 |
| 2015/0341297 A1 | 11/2015 | Barfield | |

OTHER PUBLICATIONS

Offringa, Peter "Zoosk—The Engineering behind Real Time Communications," available online at <URL http://highscaleability.com/blog/2012/8/27/zoosk-the-engineering-behind-real-time-communications.html>, Aug. 27, 2012 (4 pages).

Zoosk Customer Support, "How Do I Video Chat?" available online at <URL https://zoosk.zendesk.com/entries/20513017-how-do-i-video-chat> Oct. 7, 2011 (3 pages).

OA1 issued in U.S. Appl. No. 14/283,601 mailed Jan. 6, 2016, 20 pages.

Final Office Action in U.S. Appl. No. 14/283,601 mailed on Aug. 25, 2016.

* cited by examiner

FIG. 2C

FIG. 2D match.com | My Match | Search | My Profile | Email | Advice:

Sign In ☐ Account Settings ☐ How Match Works ☐ Help ☐

Click here to subscribe to Match.com today!

Sign up to see her profile.

Ready to learn more about who LadyDi520 is and who she is looking for? Sign up for free below!

LadyDi520
32-year old
Dallas TX, US
Active within 24 hours

Choose a username: [          ]
Choose a password: [          ]
Your email address: [          ]
I am a:        ○ Man  ○ Woman
Seeking:       ○ Man  ○ Woman
Between ages:  [25 ▼] and [33 ▼]
Your birthday: [Month ▼] [Day ▼] [Year ▼]
Your country:  [United States ▼]
Zip / postal code: [          ]
Where did you hear about Match.com: [Choose below ▼] (Optional)

[✓] Send me photos of my compatible matches. By checking this box, I also consent to receive from Match.com special offers and promotions relating to Match.com and select third parties, as well as tips and announcements on how I can better use the Match.com service.

[ ] Send me special offers and partner promotions. Receive exclusive deals and timely updates sent to you by select Match.com partners.

I am at least 18 years old and have read and agree to Match.com's terms of use and privacy policy.

FROM FIG. 2H favorite hot spots:
I love Olive Garden (cheap date) LOL then karaoke, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule

| | |
|---|---|
| sense of humor: | Clever: Nothing's better than a quick-witted comeback, Friendly: I'll laugh at anything |
| sports and exercise: | No Answer |
| common interests: | Cooking, Dining out, Movies/Videos, Music and concerts, Watching sports |

Lifestyle

| | |
|---|---|
| exercise habits: | Don't exercise |
| daily diet: | Meat and potatoes |
| smoke: | Daily |
| drink: | Social drinker, maybe one or two |
| job: | Other profession |

I am a bartender right now, I used to be a medical secretary but got tired of the 9-5 taking a break

| | |
|---|---|
| income: | $25,001 to $35,000 |
| my place: | Live with pets |
| have kids: | Yes, and they live away from home |
| how many: | 3 |
| want kids: | No Answer |
| pets: | |
| I have: | Dogs, Fish |
| I don't have, but like: | Cats |
| I don't like: | Reptiles, Birds, Exotic pets, Gerbils / Guinea Pigs / Etc., Fleas, Other |

Background / Values

| | |
|---|---|
| ethnicity: | White / Caucasian |
| faith: | Christian / Other |
| education: | Some college |

Ohio State for 2 years

FROM FIG. 2I

| | |
|---|---|
| languages: | English |
| politics: | Conservative |
| About My Date | |
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |
| | Fun |
| | Boot scootin' across gritty floorboards, the band playing what we'll soon remember as "our song" |
| Photos | |

FIG. 3B

SYSTEM AND METHOD FOR COACHING A USER ON A WEBSITE

TECHNICAL FIELD

This disclosure relates in general to the field of communications and, more particularly, to a system and a method for coaching an end user with an online dating service.

BACKGROUND

Online communities and social networks offer end users a convenient and effective platform to connect with other end users. In the case of an online dating service or platform, end users would typically provide information to populate a user profile to be used in matching the end user with other end users in the online dating community. Furthermore, end users may have different user activities, i.e., users may use the online dating service in different ways with diverse behaviors and/or habits.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-J are simplified screen shots of an example protocol for participating in an on-line dating service in accordance with one embodiment of the present disclosure;

FIGS. 3A-D are simplified screen shots of an example protocol for coaching an end user, in accordance with one embodiment of the present disclosure;

DETAILED DESCRIPTION OF EXAMPLE EMBODIMENTS

Overview

Figure 1:
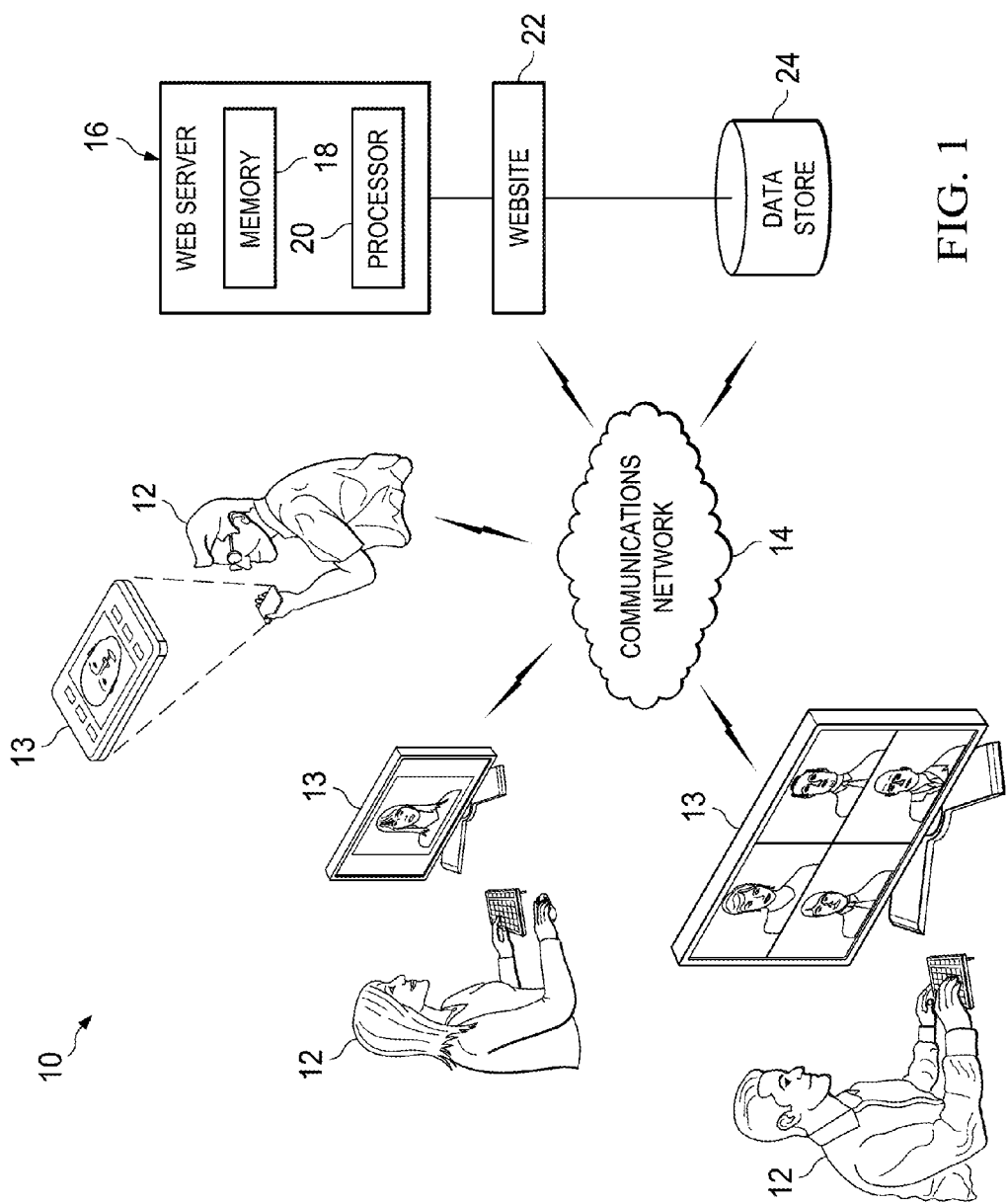
FIG. 1 is a network diagram showing an operating environment of the present disclosure, in accordance with one embodiment of the present disclosure.

Methods and systems for coaching an end user are disclosed. Information related to a user profile and/or user activity of an end user is collected in a memory. Typically, information related to a user profile comprises information that a user has specified or provided in a user profile (e.g., a personality profile and/or search criteria for matches). In some cases, the information may relate to how others have acted/interacted with the particular user profile (e.g., number of views, rank/score, appearances on other end user's matches, etc.). Generally, information related to user activity comprises information describing how the user have used the online dating service (e.g., frequency of log-in's, number of profiles viewed, number of profiles ranked/scored, etc.)

An analysis engine analyzes information against a metric. A metric may represent or include one or more characteristics of a (typical) successful end user. Said metric may be statistically determined in various ways (e.g., by the analysis engine). A rules engine generates a coaching message for output to the end user if the information does not meet the metric, wherein the one or more coaching messages provokes (or suggests) the end user to change the user profile and/or the user activity of the end user to meet the metric. A metric driven coaching mechanism advantageously guides a user in how to more effectively utilize, e.g., an online dating service. Specifically, such a metric system guides a user systematically based on statistics of other successful end users. If a metric is not met, feedback in the form of a coaching message is provided to the end user with regards to said metric to provide more transparency for the end user. The end user may then better understand how to better utilize the online dating service.

In some embodiments, a metric may represent one or more characteristics of a typical successful end user that is tailored to a particular cohort of users. For example, a metric may indicate that a typical successful end user would upload more than one photo. However, this metric could be tailored for the cohort of women, e.g., aged 30-35, where the metric may indicate that a typical successful end user would upload more than six photos. In another example, this metric may be tailored to a cohort of men, e.g., aged 40-45, where the metric may indicate that a typical successful end user would upload more than two photos to achieve the same level of success.

In some embodiments, the analysis engine is configured to analyze the information related to the user profile and/or user activity of the end user against a further metric. The rules engine is further configured to generate a further coaching message for output to the end user if the information does not meet the further metric. The further coaching message provokes the end user to change the user profile and/or user activity of the end user to meet the further metric. The end user is advantageously evaluated against a plurality of metrics.

The ability to evaluate the information against a plurality of metrics allows the coaching mechanism to follow a logical hierarchy of metrics for a more sophisticated approach. In some embodiments, the metric and the further metric are arranged in a logical hierarchy of metrics, and the respective analyzing and generating steps for the metric and the further metric are performed in an order according to the logical hierarchy. In some embodiments, the logical hierarchy may be tailored to a particular cohort of users, such that the arrangement of metrics within a logical hierarchy may differ from one cohort to another. For instance, the order of importance of various metrics may differ from one cohort to another, leading to a different logical hierarchy for different cohorts.

To provide coaching messages in an appropriate order, the coaching message and the further coaching message are stored in a queue of coaching messages. As such, the coaching messages in the queue are provided as output to the end user in an order according to the queue. In this fashion, the coaching messages are provided to the user based on the order of the metrics which generated the coaching messages. This feature is advantageous because, if the metrics are arranged in a logical hierarchy, e.g., in an order of importance, the coaching messages are provided as output to the user in the same order provided by the logical hierarchy. For instance, the queue may allow the coaching messages to be provided to the user sequentially (i.e., one by one, in the order provided by the queue).

In some embodiments, the analysis engine is configured to analyze the information against one or more metrics according to a predetermined schedule, or upon one or more changes to the user profile and/or user activity of the end user. The iterative process provides coaching to the end user over time, e.g., by providing further coaching when the user profile and the user activity has changed.

In some embodiments, metrics may be (statistically determined and/or recalibrated) according to a predetermined schedule (e.g., periodically, or according to when the system is updated with new feature(s)), and/or upon a sufficient amount of change in user profiles and/or user activity has been observed for a group of users. Over time, the features of the system (e.g., features of the online dating service) would change. Therefore, metrics may be updated because the user profiles and/or user activity would also change (thus affecting what may or may not be a characteristic of a successful end user). Furthermore, metrics may be updated because users may act upon the coaching messages and thereby affecting what may or may not be a characteristic of a successful end user due to user's changes in their user profile and/or user activity.

Example Embodiments

FIG. 1 is a network diagram showing an operating environment of the present disclosure, in accordance with one embodiment of the present disclosure. To illustrate the operating environment, FIG. 1 shows a simplified block diagram of an exemplary system 10 for providing an online dating service in a network environment. Although the present disclosure is described in the context of an online dating service, the disclosure is applicable to other but similar online communities or social networks utilizing the operating environment to provide a platform for end users. For instance, in other embodiments where communications or matching is valuable, system 10 can be leveraged to identify and to evaluate suitable candidates in other contexts, e.g., hiring/employment, recruiting, real estate, general person searches, etc.

FIG. 1 includes multiple end users 12 and endpoints 13, a communications network 14, a (web) server 16 comprising memory 18 and at least one processor 20, a website 22 (or in some embodiments, an application), and a data store 24. Data store 24 may be any type of mechanism for storing data, including but not limited to one or more files, databases, memory devices, mass storage devices, data centers, etc. System 10, users 12 interact with web server 16 via endpoints 13, each of which comprises an appropriate user interface for interacting with web server 16 via website 22 for facilitating functions and features described herein. Generally, web server 16 is configured to provide output for the end user to consume at the end point. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10.

End users 12 may include a variety of types of end users, such as clients, customers, prospective customers, customer care agents, or entities wishing to participate in an online dating service and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data (or sometimes referred to as "information") as used herein in this document, refers to any type of numeric, voice, video, or script data, or any other suitable information in any appropriate format that may be communicated from one point to another.

End users 12 may access the aforementioned data via endpoints 13, which may be inclusive of devices used perform various user activities, e.g., logging in, viewing a profile, initiating a communication, receiving communications/information from the server through an email/phone/messaging application, etc. Note that the broad term "user" or "end user" encompasses any type of node or user device, or any type of endpoint discussed herein. Additionally, the term "user" or "end user" can further include any type of profile to be used in the system discussed herein. Hence, the term "user" or "end user" can include (but is not limited to) elements such as a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within communication system 10. The endpoints may be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

A user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22. Web server 16 has access to transmit and receive user or presence data (e.g., user profile data, user and/or user endpoint data, user contact data, etc.) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate user actions associated with finding a potential match candidate. Alternatively, communications network 14 could be a plain old telephone system (POTS), which end user 12 could use to perform the same operations or functions. In some embodiments, communications network may be a mobile phone (cellular) network, which end user 12 could use to perform the same operations or functions via, e.g., Short Message Service (SMS) messages, Multimedia Messaging Service (MMS) messages, etc. Such transactions may be assisted by management associated with website 22 and/or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a computer server that is operable to receive and to communicate information to one or more end users 12. In a generic sense, (web) server 16 can implement a computer-implemented matching system that provides a framework/platform for suitable matching activities. Alternatively, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein.

In one particular embodiment, web server 16, via interaction with database 24 and/or in conjunction with website 22, is engaged in facilitating interaction(s) between parties interested in seeking a romantic partner (i.e., in an online dating scenario). For example, website 22 can be online dating service provider www.Match.com, www.Chemistry.com, or any other suitable provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 (or one or more applications) is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, application, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, messaging text reminders, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from (member) end users to form a user profile. FIGS. 2A-2J also illustrates exemplary user activity of an end user on the website. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
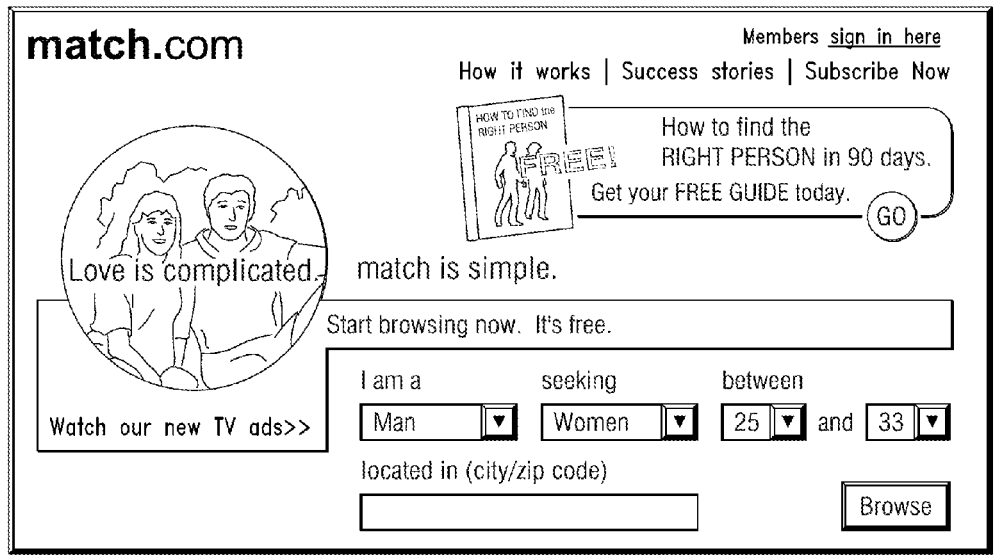
Figure 2B:
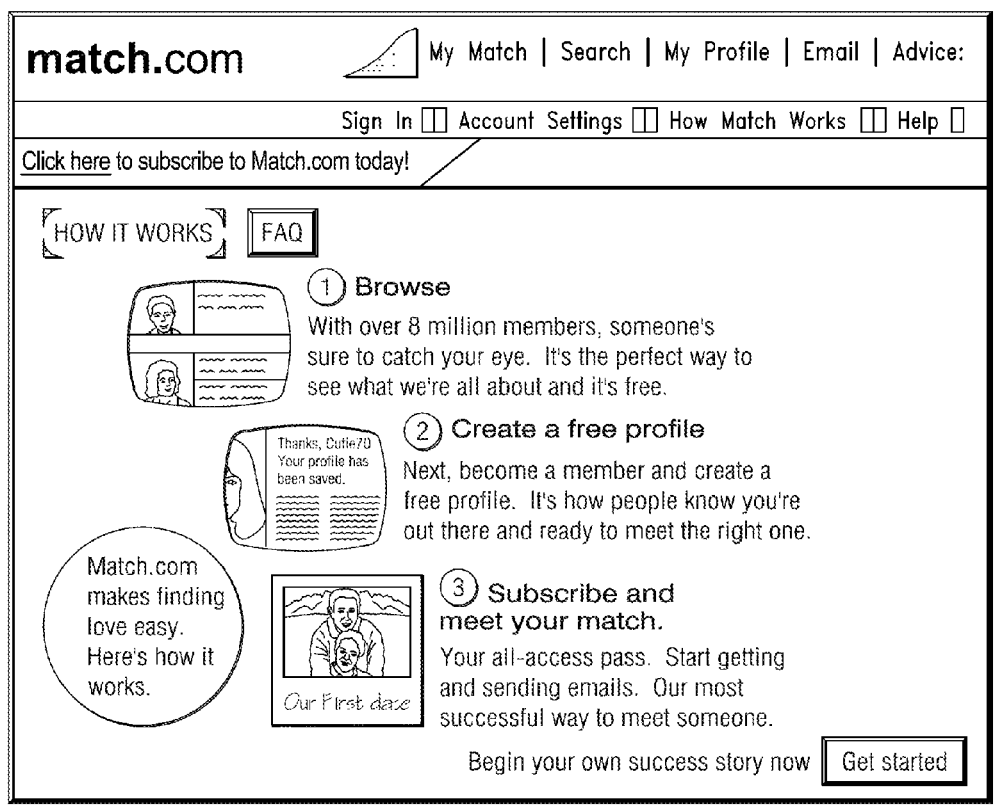

FIG. 2A is an example screen shot of a web page from which an interested end user may begin his/her journey. In the illustrated example, the web page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the web page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view profile photos of members along with summaries of the members' profiles. After browsing the website, the end user may decide to create a free user profile. Once the end user browses the website and creates a user profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male end user named "Tom" who is interested in finding a female match.

Figure 2C:
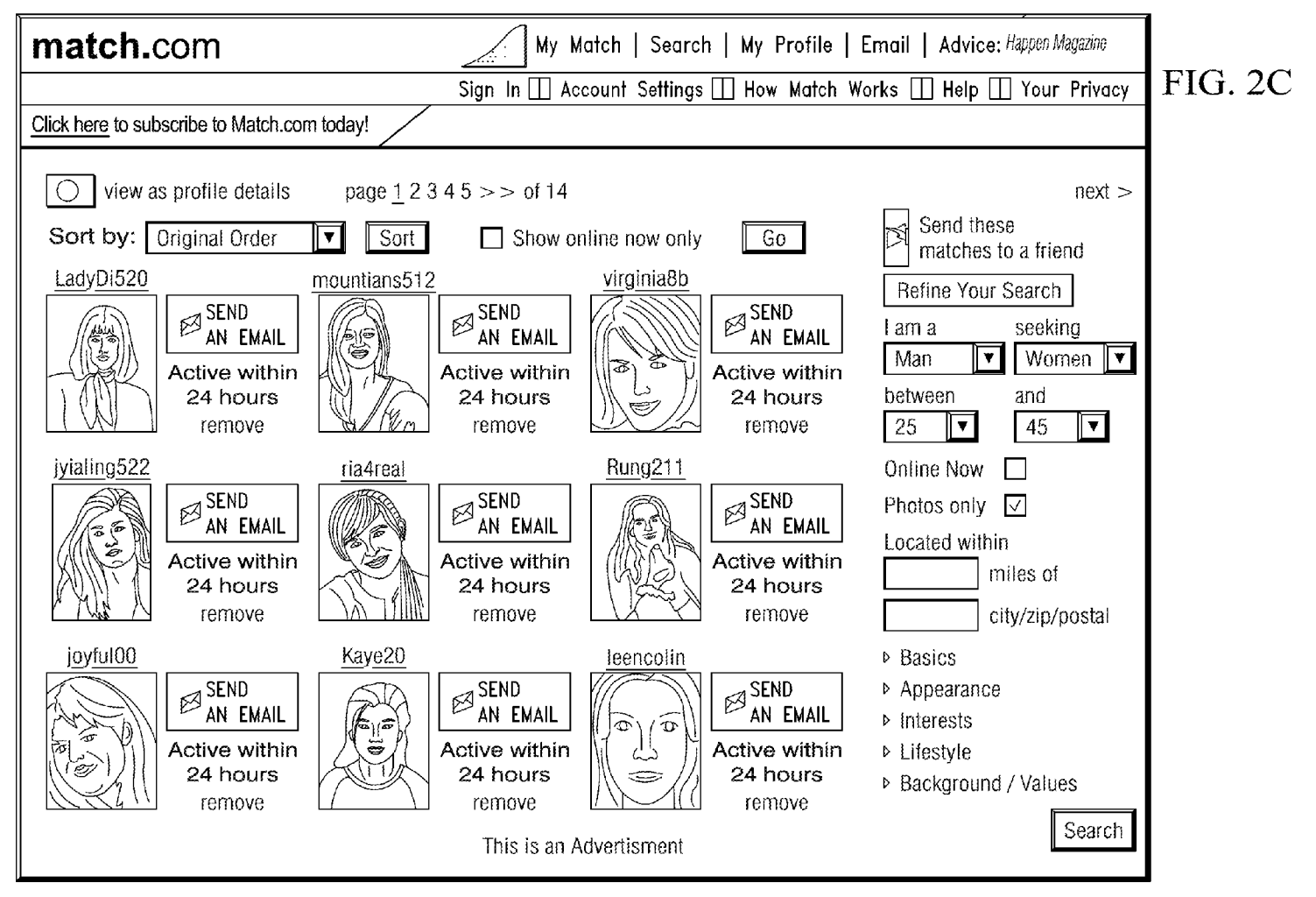

FIG. 2C is an example screen shot of a number of user profiles (in this case, profile photos, user names, last-active information) that may be viewed by Tom during the browsing phase described above. In the context of this screen shot, Tom may be simply browsing. Assuming Tom has decided he would like to know more about one of the members whose user profile is presented in FIG. 2C, he may click on the profile photo associated with the selected user profile. For example, assuming Tom has decided he would like more information about user with user name "LadyDi520", clicking on her picture results in his being directed to a web page as shown in FIG. 2D, where he is solicited to sign up for the online dating subscription such that he can effectively contact his candidate selection. It will be noted that the information solicited for a user profile using the page shown in FIG. 2C may be used in selecting matches for Tom. The information may also be displayed on Tom's profile page or summary thereof presented to other users to assist those users in determining whether they are interested in interacting with him.

Figure 2E:
Figure 2F:
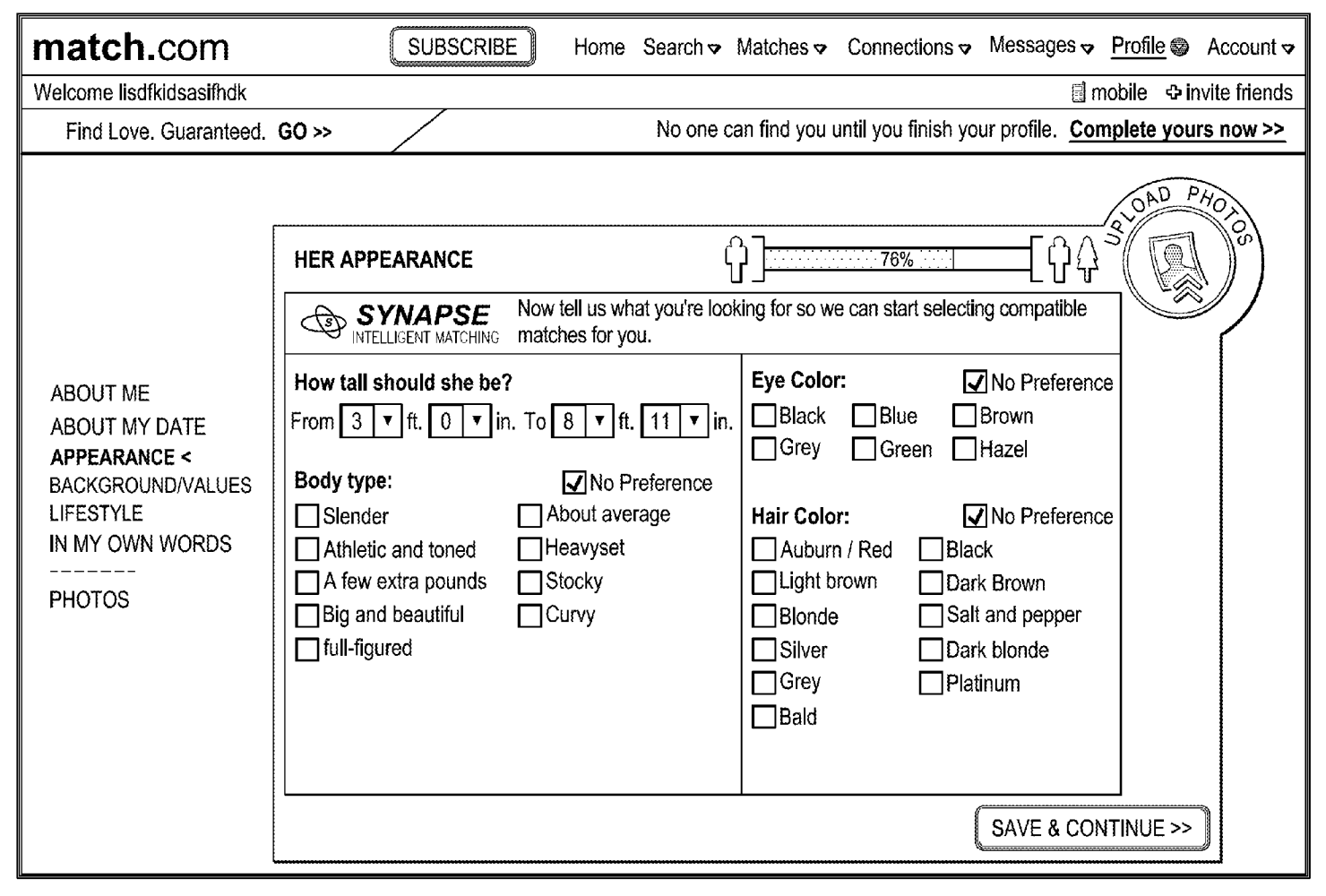
Figure 2G:
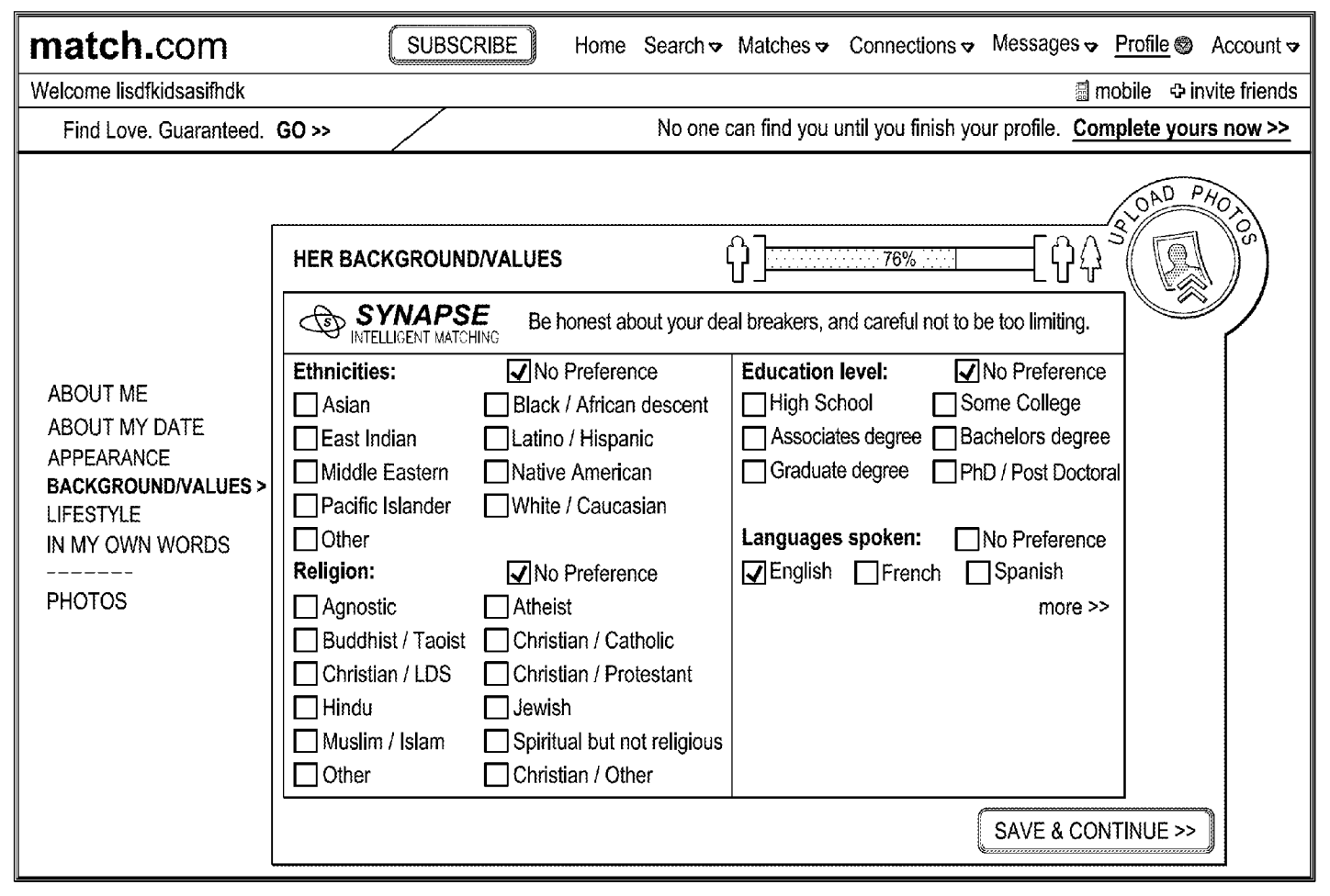

FIGS. 2E-2G illustrate various screen shots comprising a user information collection process, i.e., for collecting information for populating a user profile in accordance with one embodiment. Using the web pages illustrated in FIGS. 2E-2G, system 10 collects a variety of information from an end user, including, but not limited to, basic information about the end user (FIG. 2E), search criteria for matches (FIG. 2E), as well as information about the type person the end user would be interested in dating, including information about a potential date's physical appearance (FIG. 2F) and background and values (FIG. 2G). System 10 may also ask the user to upload one or more photos for the user profile. It will be recognized that the information collected using the web pages illustrated in FIGS. 2E-2G is illustrative only and that any type/amount of information for a user profile may be solicited in the illustrated manner.

Figure 2H:

FIGS. 2H-2J are example screen shots of the full user profile of LadyDi520, the end user corresponding to the picture Tom selected while browsing. In the illustrated user profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include one or more photos, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

Upon completing a profile, an end user awaits to be contacted to begin a conversation, and/or approaches other end user(s) to start a conversation. In an online dating scenario, successful end users, end users who are able to use the online dating service to find dates or matches, tend to maintain conversations/communications with other end users (i.e., a sign or indication that the end user is finding and speaking with matches through the online dating service). Statistical analysis performed based on the information from and/or related to the user profiles and/or user activities of successful end users has revealed nontrivial results. The results show that these successful users have user profiles and/or user activities which exhibit characteristics that may not be present with unsuccessful users.

From the statistical analysis performed on user profiles and/or user activities of successful end users, one or more metrics are determined/defined. The metric may be (positively) defined to include one or more characteristics representative of a successful end user, i.e., characteristics of a user profile or user activity indicative of a successful end user. If the information of the end user does not meet the metric, one or more coaching messages is generated. Depending on the implementation, a metric may be (negatively) defined where the metric includes one or more characteristics representative of an unsuccessful end user, whereby information of an end user matching the metric would cause one or more coaching messages to be generated. For conciseness, the disclosure discusses embodiments with positively defined metrics. However, the disclosure does not exclude the implementations where at least one negatively defined metric is used.

Results from statistical analysis further show that different cohorts of successful end users exhibit different characteristics. Thus, metrics may be defined based on or tailored to a cohort. For example, a metric may indicate that a typical successful end user would upload more than one photo. However, this metric could be tailored for the cohort of women, e.g., aged 30-35, where the metric may indicate that a typical successful end user would upload more than six photos. In another example, this metric may be tailored to a cohort of men, e.g., aged 40-45, where the metric may indicate that a typical successful end user would upload more than two photos to achieve the same level of success. When analyzing the user profile and/or user activity of the end user, the coaching mechanism may evaluate the end user based on the cohort to which the end user belongs.

In some embodiments, metrics may be statistically determined (and/or recalibrated) according to a predetermined schedule (e.g., periodically, or according to when the system is updated with new feature(s)), and/or upon a sufficient amount of change in user profiles and/or user activity has been observed for a number of users. Advantageously, the continuing update of the metrics allows the coaching mechanism to evolve over time.

The features of the system (e.g., features of the online dating service) would change, as the service provider may add, remove, or modify features of the website (e.g., expands user profiles, adds an instant chat program, etc.). Therefore, metrics may be updated as the user profiles and/or user activity change over time (thus affecting what may or may not be a characteristic of a successful end user). Furthermore, metrics may be updated because users may act upon the coaching messages and thereby affecting what may or may not be a characteristic of a successful end user due to user's changes in their user profile and/or user activity.

The coaching mechanism may optionally collect/obtain the information from and/or related to a user profile or user activity of a particular end user for evaluation, if the information is not already readily available in the system. Using the metric(s), information from a user profile and/or user activity of a particular end user can be collected and analyzed against the metric(s). Based on whether the information meet or does not meet the metric (i.e., whether the user profile and/or user activity exhibits the characteristic(s) indicative of a successful user), a coaching mechanism use the result(s) from the metrics analysis to guide an end user in becoming a successful end user. Furthermore, the coaching mechanism can be used to improve an end user's utilization of website.

To provide the coaching mechanism, one or more rules may be provided to generate appropriate, targeted, and/or personalized coaching messages to the end user to provoke the end user to, e.g., change the user profile of the end user, and/or change the user activity of the end user on the website. The one or more rules are defined based on the one or more metrics. Depending on the analysis of the information from a user profile and/or user activity against the one or more metrics, the rules provide the logical means or steps for generating one or more coaching messages for output (at an end point) to the user based on the results from the metrics analysis. For instance, the coaching message(s) may be rendered for display to the user on a display device on a webpage. In another instance, the coaching message(s) may be delivered to the end user via a text message or an email.

Figure 3A:
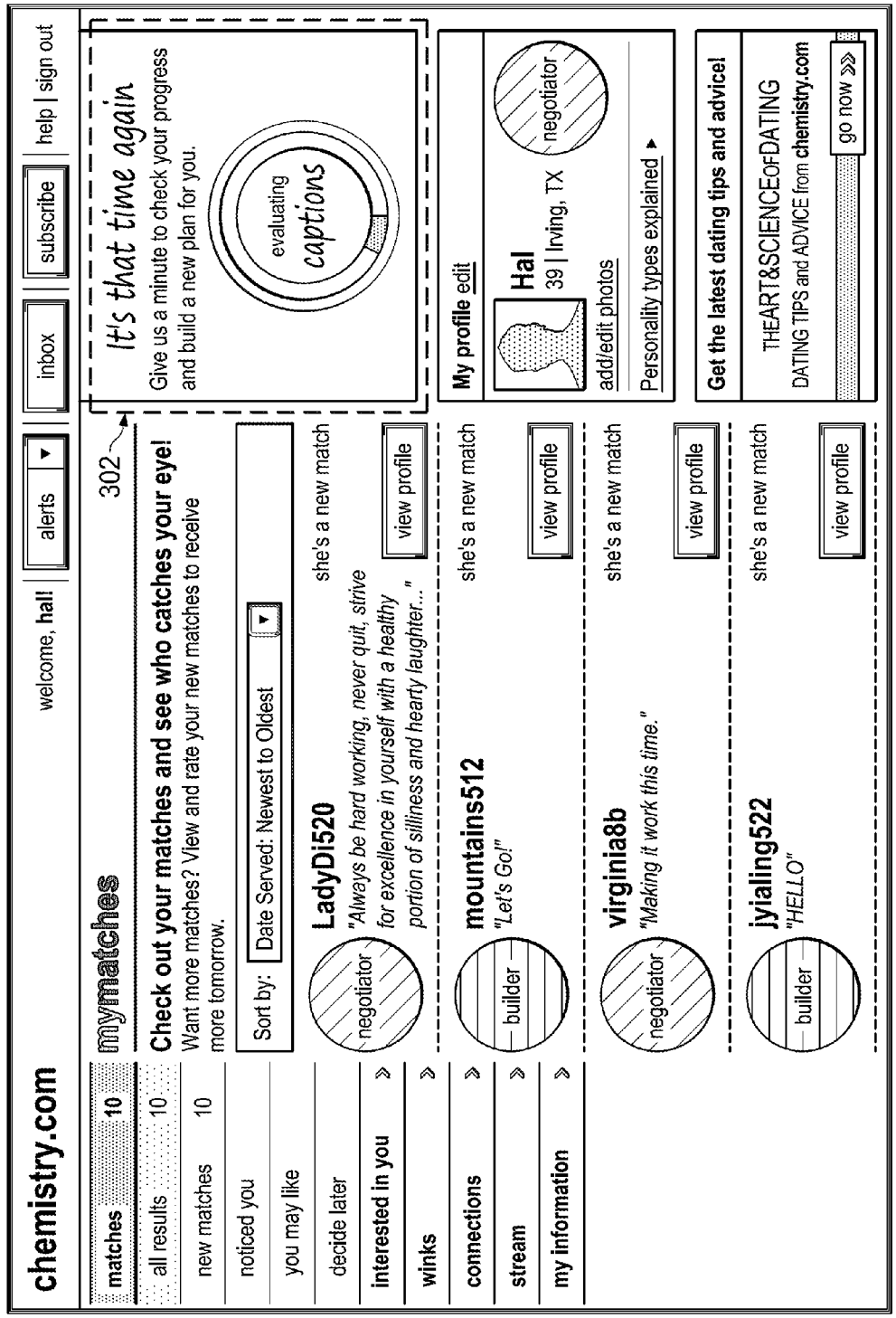
Figure 3B:
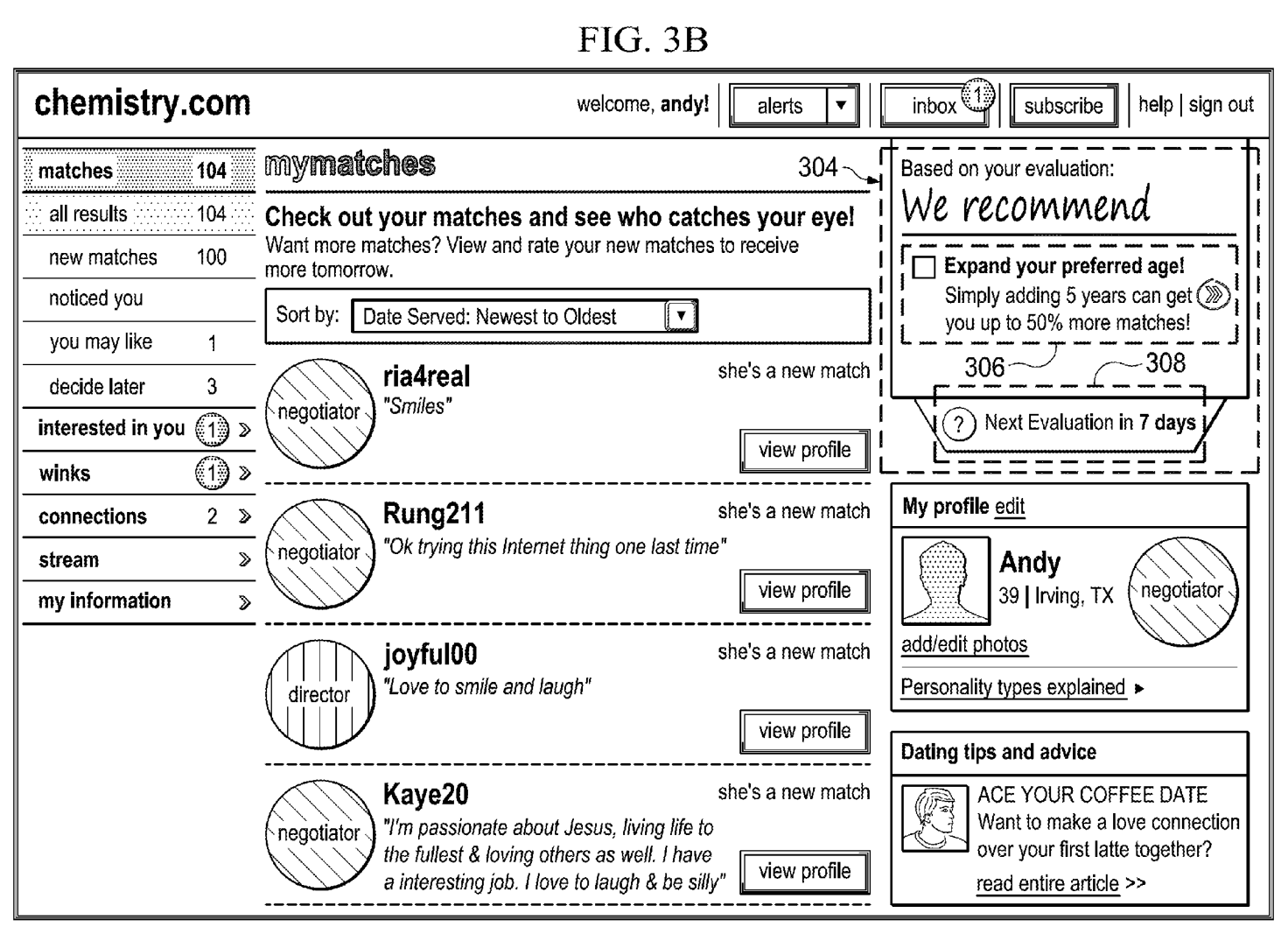
Figure 3C:
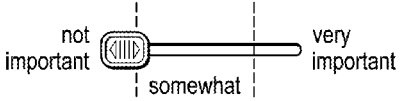
Figure 3D:
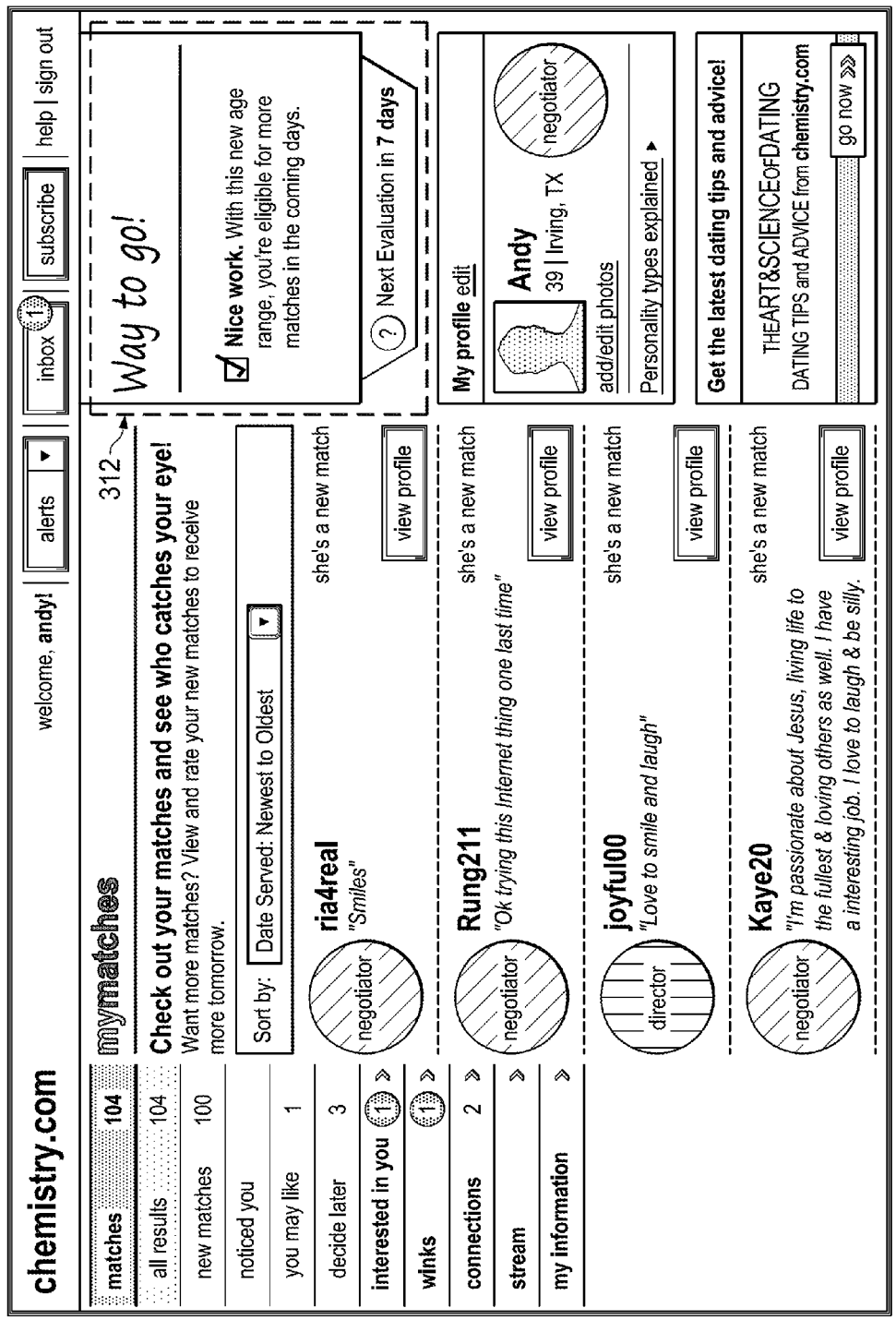

To illustrate the coaching mechanism from an end user's perspective, FIGS. 3A-D are simplified screen shots of an example protocol for coaching an end user, in accordance with one embodiment of the present disclosure. In FIG. 3A, the screen shot shows a webpage, e.g., a page having a listing of matches "carolchadd", "jen", "lisa", and so on. On the webpage, a user interface part 302 (e.g., the area labeled "It's that time again") is displayed to the user showing that the user profile and/or the user activity of the end user is being collected and analyzed (e.g., by displaying a moving graphic indicating that the information is being evaluated or processed). In some embodiments, the end user may have optionally activated a user interface part to initiate the collection and/or the analysis of the end user's user profile and/or user activity (in a screen prior to the one shown in FIG. 3A). In some embodiments, the collection and/or analysis of information without manual initiation from the end user.

The screen shot in FIG. 3 shows that the system is analyzing/evaluating "captions" information in the user profile. Other types of information from a user profile and/or user activity subject to collection and/or analysis are envisioned by the present disclosure, e.g., number of profile photos, search criteria for matches, frequency of login's to the website, how often a user clicks to view a profile, etc.

In some embodiments, a metric may comprise or represent one or more characteristics of a user profile and/or user activity that is typical of a successful user. Once the information from a user profile and/or user activity is analyzed or evaluated against one or more metrics, one or more rules may, individually or in combination, specify the logic for generating one or more coaching messages based on the metrics analysis. In FIG. 3B, a screen shot showing that a coaching message "Based on your evaluation, we recommend" in user interface part 304 generated and provided for output to the end user. For instance, if successful end users have the characteristic that the search criteria for matches specifies an age range of 20 years, a metric may evaluate whether the search criteria information in a particular end user's user profile specifies an age range of at least 20 years.

A rule may be defined to generate a coaching message "Expand your preferred age! . . . " if the search criteria information in the particular end user's profile specifies an age range less than 20 years. The coaching message may provoke the end user to change the user profile and/or the user activity of the end user to meet the metric, e.g., to suggest that the end user to expand the search criteria information to include a larger age range. The coaching message may provide positive reinforcement to encourage end users to increase their chances of success and/or to better utilize the online dating service.

In certain embodiments, the user interface part 304 displaying the coaching message or the coaching message itself may further include a user interface part 306 that a user can interact with or act upon to perform an action which changes the user profile and/or the user activity of the end user to meet the metric. In the case of a website, a link and/or a button (clickable element) may be provided to allow the user to act upon the recommendation suggested by the coaching message "preferred age range" to expand the age range by 5 years. For example, the end user may be sent to the screen shown in FIG. 3C to change, e.g., the upper limit of the preferred age range in the end user's user profile (as seen in the exemplary dropdown menu 310, where the user is changing the previous upper limit of "40" to "45"). In some embodiments, upon detecting that the end user has taken the action which changes the user profile and/or user activity to meet the metric which caused the coaching message to be generated, the end user may be sent to the screen shown in FIG. 3D, e.g., which outputs a positive message (e.g., defined by one or more rules in relation to the metric) to the end user in a user interface part 312 to acknowledge that the end user has taken an action to become a more successful end user.

In some embodiments, the coaching mechanism performs the analysis of the information from a user profile and/or user activity of a particular end user according to a predetermined schedule or timing. As seen in user interface part 308, the exemplary coaching mechanism is scheduled to run again in 7 days. Other schedules or timings are envisioned, such as every day, every week, every month, and so on. A schedule or timing may be periodic or aperiodic. The schedule or timing may be determined based on at least one of: the time of day, the date, the day of the week, the month, the year, the season, holidays, etc. A schedule or timing may be determined based on when a user profile and/or user activity is expected to change sufficiently to allow for different coaching message(s) to be generated. Otherwise, if end users are consistently being asked to do the same thing through the same coaching message, the end user may experience fatigue or feel annoyed and would have less desire to act upon the coaching message to become a more successful end user.

In some embodiments, the coaching mechanism analyzes the information against one or more metrics for another iteration upon one or more changes to the user profile and/or activity of the end user (rather than based on a predetermined schedule or timing). In certain embodiments, the coaching mechanism analyzes the information against one or metrics for another iteration upon the end user performing one or more actions which changes the user profile and/or the user activity of the end user to meet one or more metrics (e.g., such as the action suggested by a coaching message provided as output to the user). Such a coaching mechanism may have a higher likelihood of generating a different coaching message over time (by running another iteration upon feedback that a change to meet a previously unmet metric is made to meet the metric). Advantageously, the schedule, timing, and "when" the coaching mechanism is run may enable the coaching mechanism to feel more natural to the end user, as a guide which helps the user over a period of time.

Figure 4:
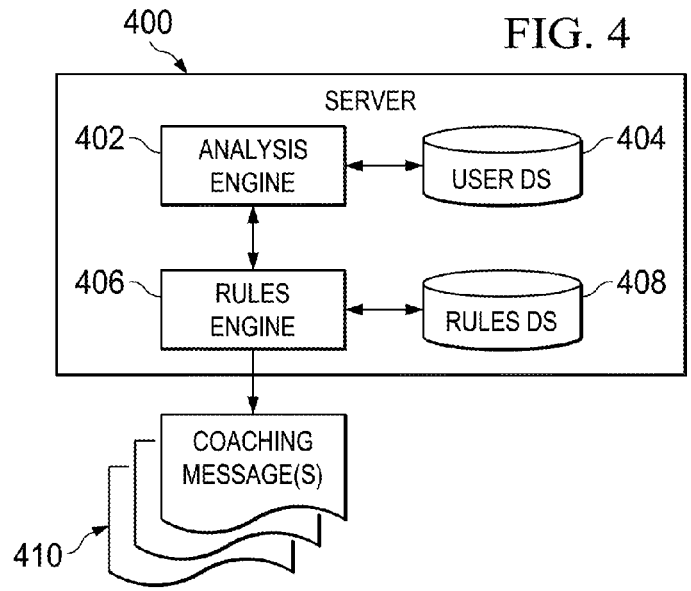
FIG. 4 is a system diagram showing an illustrative server configured to coach an end user, in accordance with one embodiment of the present disclosure.

FIG. 4 is a system diagram showing an illustrative server 400 configured to coach an end user, in accordance with one embodiment of the present disclosure. To implement various coaching mechanisms described herein, the server 400 comprises an analysis engine 402, a user data store 404, a rules engine 406, and a rules data store 408. Information from a user profile and/or user activity of one or more end users may be collected and stored in user data store 404 (which may be a database stored in, e.g., memory 18 of the server 16 of FIG. 1). The analysis engine 402 may access user data store 404 to obtain and analyze information from a user profile and/or user activity of an end user against one or more metrics (referred to as the metrics analysis). Generally, rules are defined to provide logic means or steps for providing one or more appropriate coaching messages based on the results of the metrics analysis. Accordingly, the rules engine 406 takes the results from the analysis engine 402, and uses one or more rules obtained from the rules data store 408 to generate one or more coaching messages 410 for output to the end user. The analysis engine 402 and/or the rules engine 406 may be implemented in a component such as processor 20 of server 16 in FIG. 1. The coaching message(s) 410 may be rendered for output to a user through an output device such as a display device or an audio generating device. In some embodiments, the analysis engine 402 and the rules engine 406 may be implemented together (or at least in part integrated together) in the same functional element within the server 400.

Figure 5:
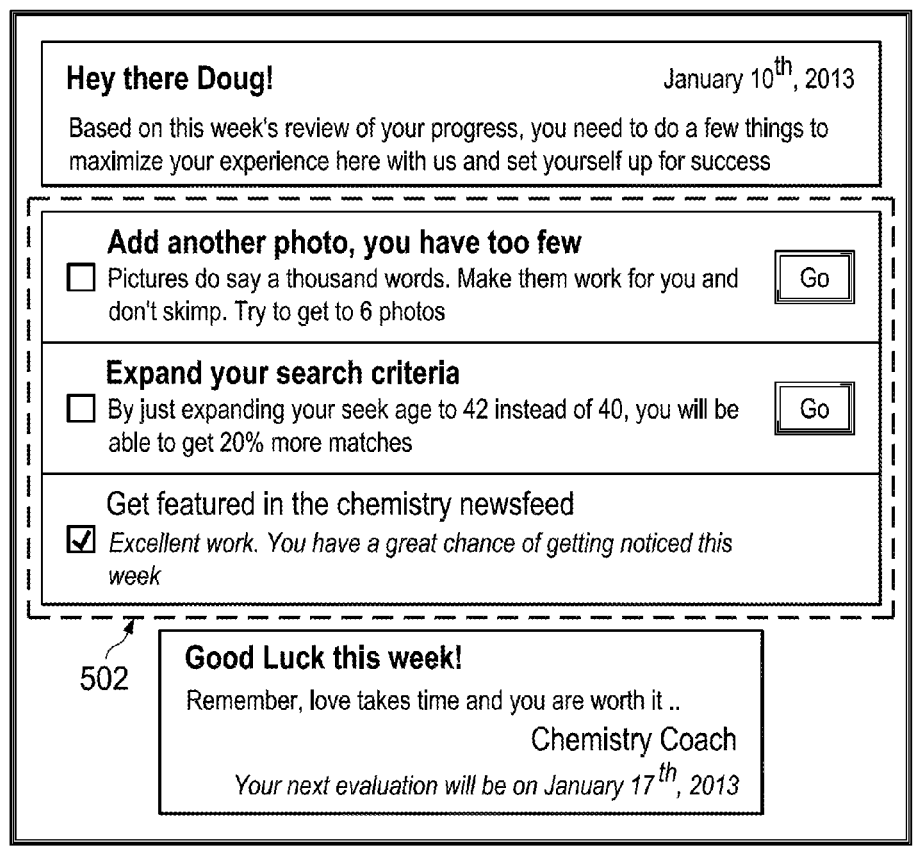
FIG. 5 is a simplified screen shot of another example protocol for coaching an end user, in accordance with one embodiment of the present disclosure.

FIG. 5 is a simplified screen shot of another example protocol for coaching an end user, in accordance with one embodiment of the present disclosure. Rather than providing only one coaching message to an end user, screen shot shown in FIG. 5 shows that the coaching mechanism may output a plurality of coaching messages to an end user (e.g., such as three messages seen in user interface part 502). In such a case, the coaching mechanism may analyze the information from a user profile and/or user activity against more than one metric. Based on the results from the metrics analysis, appropriate coaching messages are generated for output to the user using one or more rules defined for the plurality of metrics. For instance, a rule may be defined to display a corresponding coaching message if a metric is not met.

A user may use the plurality of coaching messages as a checklist, and act upon of the coaching messages one by one. An exemplary table showing metrics and corresponding coaching messages to be generated for output to the end user if the particular metric is not met is shown below:

| METRIC | COACHING MESSAGE |
|---|---|
| Number of profile photos in user profile is at least 6 | "Add another photo, you have too few . . ." |
| Search criteria for matches has an age range of at least 15 years | "Expand your search criteria . . ." |
| User has paid to be featured in the newsfeed | "Get featured in the newsfeed" |

In some embodiments, a coaching message includes a suggestion/tip to encourage the user viewing the message to take an action. For instance, a coaching message may suggest the user to expand the search criteria for age by 10 years to improve his/her matches in order to meet a metric ("Improve your matches by expanding your search criteria by 10 years! Let's visit your search criteria I"). In response to the coaching message, the user may click on a link to visit the search criteria page to edit his/her search criteria.

In certain embodiments, a coaching message includes a specific/personalized action which allows the user meet the metric by accepting the coaching message (e.g., by providing user input to indicate that the user wishes to accept the coaching message). A user may instead provide user input to ignore, skip or not accept the coaching message. For example, a coaching message may include a question or request for permission from the user to expand the search criteria for age by 10 years on behalf of the user ("Expanding your search criteria for age from 25-35 to 20-40 would dramatically improve your matches. Would you like to do so?"). Another example coaching message may be: "We've evaluated your matches and recommend you widen your search age range to 33-42. Click the button to accept these recommended changes, or the Cancel button to cancel this recommendation." In response to the coaching message, a user may, e.g., through the graphical user interface, provide user input to accept or not accept the coaching message. Upon receiving an acceptance of the coaching message, the action associated with the coaching message to meet the metric is performed by the coaching mechanism. A confirmation message may be provided to the user to indicate that the metric has now been met, or the specific action associated with the metric has been taken to meet the metric.

In some embodiments, the user may provide user input to (pre-)authorize actions to be taken for one or more coaching messages or (pre-)accept coaching messages. The coaching mechanism is then configured to analyze information from a user profile and/or user activity and take action to meet one or more metrics without individual authorization/acceptance of the coaching messages. The user may be optionally notified after action(s) have been taken to meet the metrics.

Some coaching messages may require more user input than others (e.g., coaching messages which require the user to upload photos, provide longer user profile description, provide photo captions, log in more often etc.), while some coaching messages may require less user input (e.g., changing search criteria). Thus, the type of coaching messages which may require less user input may be more suitable for the embodiments where users may accept or not accept a coaching message. A combination of different types coaching messages may be used, and the manner in which the coaching messages are provided to the user may differ (e.g., allowing the user to accept the coaching message to meet the metric, informing the user of the action available for meeting on the metric, or allowing the user to more easily act on the coaching message).

Figure 6:
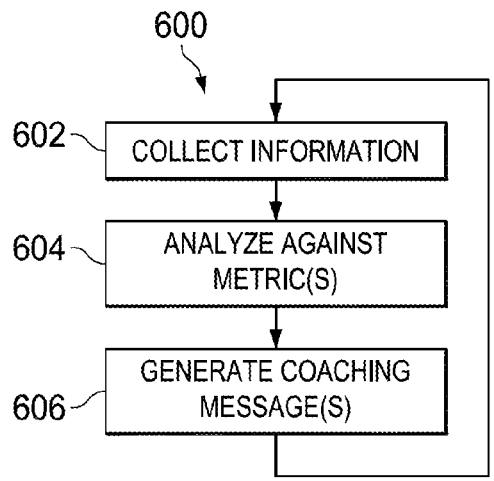
FIG. 6 is a flow diagram illustrating a method or logic implemented by the server, in accordance with one embodiment of the present disclosure.

FIG. 6 is a flow diagram illustrating a method or logic implemented by the server, in accordance with one embodiment of the present disclosure. The method 600 illustrates an exemplary implementation of a coaching mechanism. At step 602, information from and/or related to a user profile and/or user activity is collected. For instance, information that an end user had provided in a user profile (or information related or derivable thereto) and/or usage statistics related to the end user activity on the website may be obtained and stored in a memory, e.g., in a user data store. This step enables the creation of a personalized evaluation of the end user. The subject matter of the information and/or the manner in which the information is collected may depend on the one or more metrics against which the end user is to be evaluated.

At step 604, the information collected in step 602 is analyzed or evaluated against one or more metrics, e.g., using an analytics engine. For example, a metric may include a characteristic that a user has at least 6 profile photos. The information collected in step 602 may include the number of profile photos a particular end user has. The number of profile photos a particular end user has is analyzed/evaluated against the metric to determine whether the information meets the metric or not.

At step 606, the result(s) from step 604 is provided to, e.g., a rules engine, to generate one or more coaching messages for output to the end user. For instance, depending on whether or not the information in step 602 meet one or more metrics in step 604, one or more coaching messages are generated based on one or more rules. A rule may define the logical means or step(s) for generating one or more coaching messages depending on the results in step 604. The coaching message(s) may provoke the end user to change the user profile and/or the user activity to meet the metric (if it was found in step 604 that the information in step 602 does not meet the metric in step 604).

It is noted here that the metrics described herein include and/or are related to characteristics of a successful user on the online dating service. These metrics are distinguished from generic metrics, which may check whether an end user's user profile is complete or not complete. Such a generic metric is unsubstantiated by data which shows how successful end users behave or what successful end users have in their user profiles. To provide more specific metrics, the disclosed embodiments herein may provide statistically determined metrics which aim to measure a particular end user's user profile and user activity. These metrics would include characteristics determined statistically from many successful end users. These substantiated metrics can be determined based on different cohorts/markets of end users, because different cohorts markets (e.g., groups based on age, geographic area, ethnicity, cultural background) may have different metrics, i.e., characteristics of successful end users in different markets may vary. As a consequence, these metrics are advantageously specific and tailored to the market that the end user is located for better coaching results. Furthermore, these metrics are statistically determined based on actual end users and may be updated over time. Because the characteristics of successful end users may change over time, the metrics would also change over time, thereby providing adaptability of such a coaching mechanism. End users who have taken an action based on the coaching message(s) may become successful end users themselves, and such information (e.g., as feedback to the coaching mechanism) may also be used to update the metrics.

The statistical analysis of the successful end users may result in different types of metrics. For instance, different types of metrics may define different kinds of boundary value(s) which are used to determine if the information related to a user profile and/or user activity of a particular end user meets the metric or does not meet the metric. The different kinds of boundary values may include at least one of the following:

Fixed: The metric evaluates whether a characteristic of the user profile and/or user activity meets a particular value.
Minimum: The metric evaluates whether a characteristic of the user profile and/or user activity exceeds a particular minimum value.
Minimum: The metric evaluates whether a characteristic of the user profile and/or user activity is lower than a particular maximum value.
Range: The metric evaluates whether a characteristic of the user profile and/or the user activity is within a particular range (or set) of values.

The particular value may be determined in different ways:
System Median: A median of a characteristic is taken across substantially all successful end users.
Cohort (Local/Group) Median: A median of a characteristic is taken across all successful members in the end user's group (the cohort in which the end user belongs). This type of boundary value may be used for the metric whenever the metric is dependent on external factors, e.g., the number of end users in the group. The cohort median advantageously allows metrics to be defined based on a particular cohort, where the typical successful end user may change from one cohort to another.

The simplest metric may be related to one characteristic of a user profile and/or a user activity. In some embodiments, a metric may be combine, in any suitable manner, more than one characteristics as a single metric. A metric may be defined recursively, wherein a metric may itself include one or more metrics.

Depending on the application, the rule(s) used in the rules engine for providing the logical means/steps to generate the appropriate coaching messages may vary. Rules are defined to provide the logic which allows appropriate coaching message(s) to be generated. A simple rule may be defined such that if a particular metric is not met, then a corresponding coaching message is displayed. A less simple rule may be defined such that if a particular metric is not met, then a coaching message is generated based on information related to the user profile and/or user activity of the end user. In such a case, the coaching message may be (more) personalized to the end user. For example, a different coaching message may be generated and rendered for output based on the age, sex, and/or sexual orientation of the end user. In another example, the mode for delivering the coaching message (e.g., on the website, via email, via text messaging) may differ based on the user profile and/or user activity of the end user.

In some embodiments, the rule or rules may be defined in more complicated manners. For instance, the rule(s) used in the rules engine may define a decision tree, which relates one or more metrics with one or more coaching messages. The decision tree comprises one or more metrics, and depending on the metrics analysis (e.g., whether a metric has been met or not met), the decision tree provides the logic which enables the rules engine to generate one or more coaching messages. In such a decision tree, the decision nodes are associated with metrics, and the end nodes are associated with coaching messages. A decision enables a logical hierarchy of metrics to be defined in the rules engine, and provides for a more sophisticated coaching mechanism. The logical hierarchy/relationship of metrics may be derived from the statistical analysis of successful end users. The statistical problem of determining the metrics and/or the logical hierarchy may be solved through artificial intelligence, e.g., by deriving classification rules from information related to two classes of end users: successful end users and unsuccessful end users.

The logical hierarchy may allow metrics to be defined with varying priorities. Because the coaching messages are tied to the metrics, the coaching messages are also (by definition) defined with varying priorities. The coaching mechanism may analyze the information from and/or related to a user profile and/or user activity for metric(s) with metrics having a higher priority before metrics having a lower priority using the logical hierarchy. For instance, the coaching mechanism may try to detect problems through metrics with a higher priority before trying to detect other problems which ought to be addressed only after the end user has taken action to meet the metrics with a higher priority. Alternatively or additionally, the coaching mechanism may output coaching messages using the logical hierarchy such that coaching messages associated with a higher priority may be output before other messages with a lower priority, or the messages with a higher priority are displayed with more prominence over other messages with a lower priority.

In some embodiments, the logical hierarchy may be tailored to a particular cohort of users, such that the arrangement of metrics (i.e., the decision tree) within a logical hierarchy may differ from one cohort to another. For instance, the order of importance/priority of various metrics may differ from one cohort to another, leading to a different logical hierarchy for different cohorts. In another instance, the set of metric(s) may be different from one cohort to another, and thus, the logical hierarchy may also differ from one cohort to another.

Figure 7:
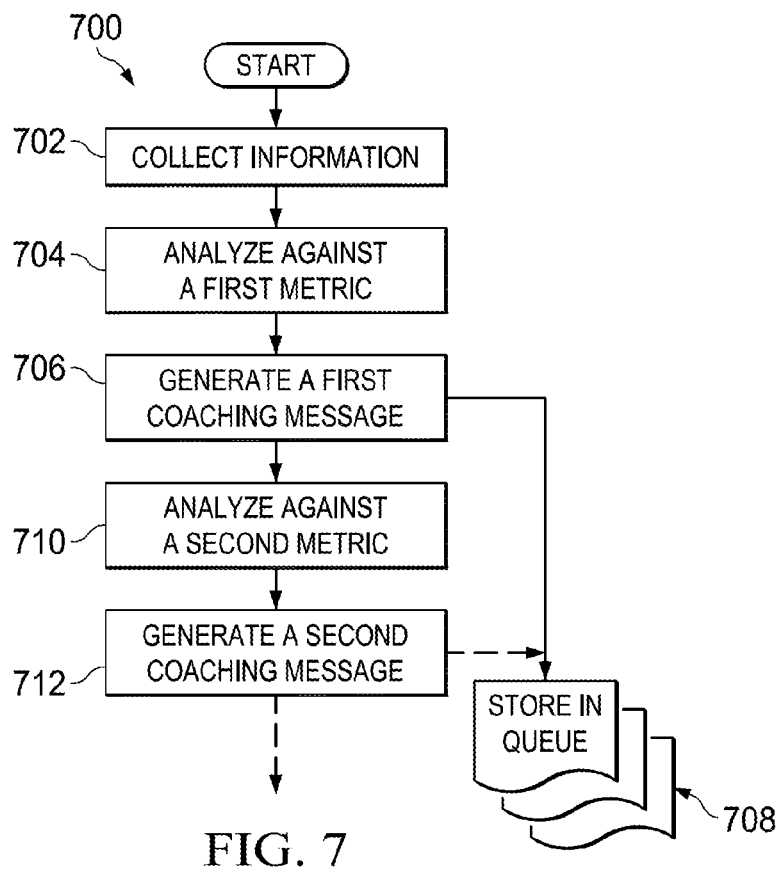
FIG. 7 is a flow diagram illustrating a method or logic implemented by the server, in accordance with another embodiment of the present disclosure.

FIG. 7 is a flow diagram illustrating a method or logic implemented by the server, in accordance with another embodiment of the present disclosure. The method 700 illustrates a coaching mechanism where more than one metric is defined (e.g., a first metric and a second metric, or more). In this instance, at least the first metric and the second metric are arranged in a logical hierarchy of metrics. Such a logical hierarchy of metrics may be defined in one or more rules, e.g., stored in a rules data store. According to the logical hierarchy of metrics, the information related to the user profile and/or user activity may be analyzed in the order according to the logical hierarchy (and if applicable, the coaching messages are generated in the order according to the logical hierarchy as well). As a consequence, the generation and output of corresponding coaching messages to the metrics may also be performed in the order according to the logical hierarchy.

At step 702, information related to a user profile and/or user activity of an end user is collected, e.g., stored in memory (similar to step 602 in FIG. 6). The first metric may be selected from other metric(s) to be analyzed before other metric(s) based on one or more rules in the rules data store. At step 704, the information is analyzed/evaluated against a first metric, e.g., using an analysis engine. Using the rules, a rules engine may generate a first coaching message if the first metric is not met in step 706.

In some embodiments, the hierarchy dictates that if a metric of higher priority is not met, the method does not continue to perform the analysis step until the end user has taken the appropriate action to meet the metric. The method may not proceed to step 710 in such embodiments.

The second metric may be selected to be analyzed based on the one or more rules in the rules data store. In some cases, more information related to the user profile and/or user activity is collected if the information is not readily available to the coaching mechanism. At step 710, information related to the user profile and/or user activity is analyzed against the second metric, e.g., using an analysis engine. At step 712, the rules engine may generate a second coaching message if the second metric is not met in step 710.

In the case where a plurality of metrics are being analyzed against the information related to the user profile and/or user activity, the coaching message(s) generated may be stored in a queue in step 708. For example, the coaching message from step 706 and/or 712 may be stored, in a first in first out queue, among other coaching message(s) generated from the metrics analysis. Using a queue, the coaching message can be provided to the user in the order that the coaching message was generated, i.e., in the order according to the queue, and by definition, the order according the logical hierarchy of metrics as well. The end user may then act upon the coaching messages in an appropriate order based on the coaching message's priority, i.e., the metric's priority as well. Advantageously, the end user is provided with coaching messages in a logical order (even if the end user is not aware of the order), where problems/issues with the end user's user profile and/or user activity may be presented and addressed systematically.

In one embodiment, a plurality of coaching messages are displayed (all) at once to the user, e.g., in a graphical user interface, in an order according to the queue. For example, a list may be provided to the user, in the order according to the queue, e.g., from top to bottom. The order according to the queue may in some cases be reflected using other visual cue(s), such as color, size, icons, etc.

In one embodiment, the coaching messages in the queue may be provided sequentially (e.g., displayed one by one, or subset by subset in a graphical user interface), where a user may provide user input to accept one or more coaching messages as the coaching messages are provided to the user (i.e., fetched from the queue). For instance, a first coaching message in the queue may be provided to the user (e.g., displayed to the user via a graphical user interface), and the user may provide user input which indicates whether the user accepts or does not accept the first coaching message.

Instead of displaying only a single coaching message at a time, a group of coaching messages fetched from the queue may be displayed at a time, and upon meeting one or more metrics corresponding to the coaching messages, one or more metrics may be fetched and displayed to the user as one or more coaching messages (where the metric(s) have been met is removed from display), e.g., on a rolling basis. In some embodiments, the user may provide user input which performs the action that meets the metric.

In response to the metric associated with the first coaching message being met (e.g., after receiving user input accepting or not accepting the first coaching message, or user input which performs the action that meets the metric), a second coaching message in the queue (if any) may be rendered for display to the user. The first coaching message may be removed from display (e.g., removed from the graphical user interface). An indication to the user may be rendered for display to the user to indicate that the first metric has been met. Any suitable visual cues may be used, such as a graphic or a message. The user is then provided with an opportunity to respond to the second coaching message (e.g., by accepting or not accepting the second coaching message).

Such a process may repeat for a pre-determined number of messages in the queue, or until the queue is empty. A subsequent coaching message in the queue may be rendered for display to the user as soon as the previous coaching message has been accepted, or a delay may be placed to allow some time (e.g., until the next log-in, after a day, after a week, etc.) to pass before the subsequent coaching message in the queue is provided to the user. Such a delay may prevent user fatigue, or a sense of being overwhelmed with changes/actions.

Depending on the implementation, more metrics are envisioned where the method may continue for further steps. The method may continue, e.g., until all metrics have been satisfied, or until some suitable condition. For instance, the method may continue until a certain number of metrics have been evaluated. In another instance, the method may continue until a certain number of coaching messages have been generated and provided to the user as output. In some embodiments, the method may iterate through the logical hierarchy of metrics again at a later time. In yet another instance, the method may continue until a certain number of coaching messages upon which the end user has acted.

Figure 8:
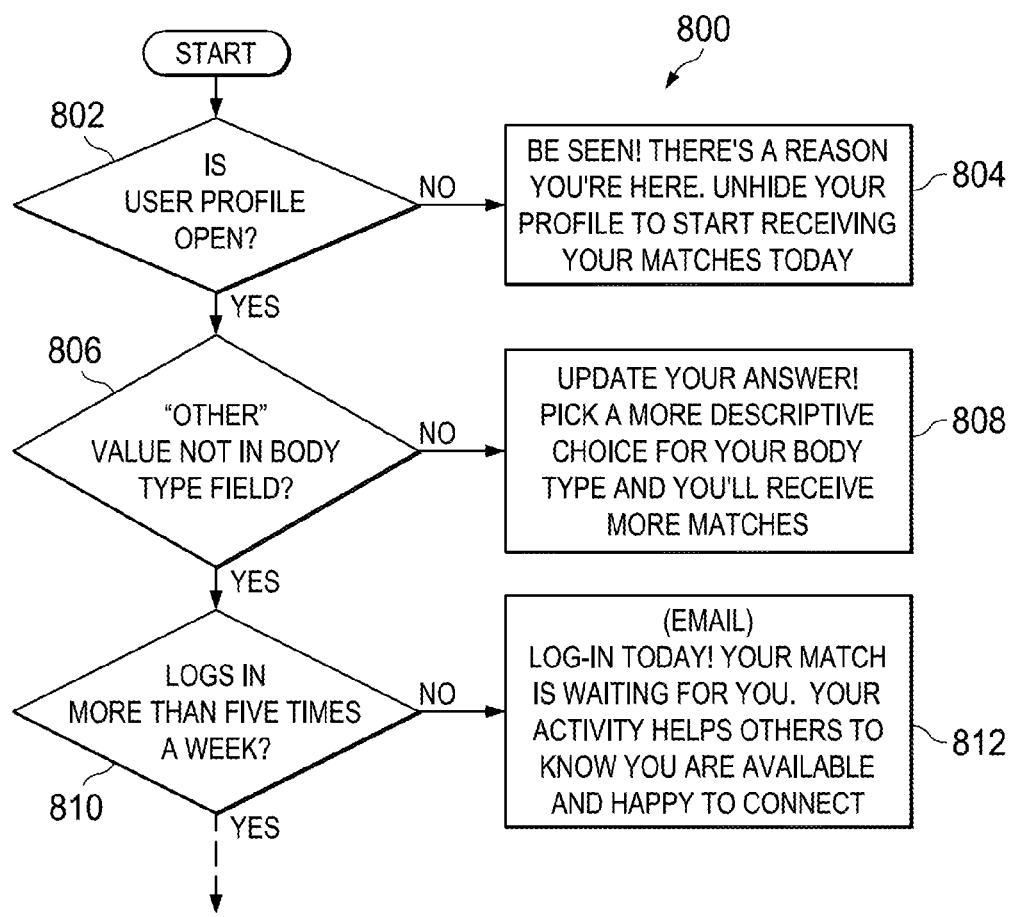
FIG. 8 is a flow diagram illustrating metrics implemented by an exemplary rules engine, in accordance with one embodiment of the present disclosure.

In some embodiments, metrics may be arranged in a logical hierarchy such that a decision tree may be used to provide proper coaching messages. FIG. 8 is a flow diagram illustrating an exemplary decision tree 800 implemented by an exemplary rules engine, in accordance with one embodiment of the present disclosure. The flow diagram shows a plurality of metrics 802, 806, and 806 (in the order of high priority to low priority) arranged in the decision tree 800 along with the coaching messages 804, 408, and 812 corresponding to the metrics. The topology of the decision tree enables the metrics with higher priority to analyzed/evaluated before metrics with lower priority.

At step 802, the metric analyzes whether the end user has made his/her user profile open to other end users (i.e., the end user has not set the profile as hidden). If the user profile is not open, a corresponding coaching message 804 is generated. In such a case, it is likely that this particular end user is not a successful end user (i.e., maintaining conversations/communications with other users) because the particular end user cannot be discovered or seen by other end users.

If the user profile is open, then the metric in step 806 is used. The metric determines whether the "Body Type" field is set to a value other than "Other" (e.g., "slender", "athletic", "skinny", "baby fat"). If the particular end user did set the "Body Type" field to "Other", a corresponding coaching message 808 is generated. Successful end users are statistically shown to receive more matches if a "Body Type" is specified.

If a value other than "Other" is set for "Body Type", then the metric 810 is used. The metric determines whether the user logs in more than 5 times a week on the website. If a particular user does not log in often enough, a corresponding coaching message 812 is sent as an email to the end user to entice the user to log in to the website more often. Successful end users are statistically shown to be active users on the website.

It is noted that any other suitable topology for the decision tree may be implemented in the rules engine in order to provide a logical hierarchy of metrics. Furthermore, it is noted that many metrics may be used. The following is a non-exhaustive non-limiting list of exemplary metrics which may be used.

Is the end user showing up on other end user's list of matches at least X number of times?
Is the user profile of the end user being viewed at least X number of times?
Does the user have a height value between X and Y?
Does the user specify "Body Type" with a value other than "Other"?
Does the user specify "Ethnicity" with a value other than "Other"?
Does the user specify "Religion" with a value other than "Other"?
Does the user specify "Political" with a value other than "Other"?
Is the user profile open to other end users?
Is the end user receiving at least X % of communications after other end users have viewed the user profile?
Does the user have at least X number of profile photos?
Does the user have at least X number of head shots? Body shots?
Does the user have at least X number of interests?
Does the user respond to at least X % communications from other end users?
Does the user login at least X number of times per day? Per week?
Does the user have a search criteria which provides at least X number of matches?
Does the user rate at least X % of the matches?
Does the user view at least X % of the matches?

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

Although the present disclosure discusses an end user being presented with an opportunity to begin an analysis of the user profile and/or user activity, and/or being presented with the one or more coaching messages to improve one's user profile and/or user activity, it is also envisioned that a customer care agent, an end user of the system, may be provided with an opportunity to begin an analysis of the user profile and/or user activity of another end user. The coaching message(s) may be presented to the customer care agent. Subsequently, the coaching message(s) may be forwarded/provided to the end user (e.g., via an online chat widget, over the phone, in an email, or any suitable communication means). The end user may then act in response to the one or more coaching messages. Such a coaching mechanism is facilitated by a customer care agent.

It should also be noted that any of the user profile portions of the platform can leverage any type of format. Thus, in any aspect of the online dating process described herein, such as establishing a personality or user profile, for example, any suitable question format (and thus values for various fields as well) can be employed. Example formats include a Yes/No format, a multiple choice question format, a short answer format, a true/false format, etc. Other formats can readily be used in order to achieve the desired responses and solicit the necessary data. Information related to the user profile in these formats are usable in measuring the end user against the metric(s).

Note that in certain example implementations, the matching functions outlined herein, such as those carried out by web server 16 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for improving an online dating system and utilization thereof through a coaching mechanism, comprising:
    collecting, in a memory, information related to a user profile, wherein the user profile belongs to a cohort of user profiles of a plurality of cohorts of user profiles, wherein each of the plurality of cohorts of user profiles is defined by one or more of the following: sex, age, geographic area, ethnicity, and cultural background;
    identifying, by an analysis engine, a logical hierarchy of metrics corresponding to the cohort of user profiles, wherein each metric in the logical hierarchy of metrics indicates a characteristic statistically representative of user profiles of successful end users in the cohort of user profiles, and wherein the logical hierarchy of metrics comprises an arrangement of metrics that is unique to the cohort of user profiles and is different from arrangements of metrics others of the plurality of cohorts of user profiles;
    analyzing, by the analysis engine, the information against at least one metric, wherein the at least one metric is selected based on the logical hierarchy of metrics;
    generating, by a rules engine, a coaching message for graphical output to an endpoint associated with the user profile if the information does not meet the at least one metric, wherein the rules engine changes the user profile on the online dating system to meet the at least one metric without receiving an input, via the coaching message, accepting the coaching message and the coaching message notifies the endpoint of the changing of the user profile on the online dating system to meet the at least one metric;
    and
    calculating an updated boundary value of the at least one metric based on changes in user profiles of the cohort of user profiles, when it is determined that the updated boundary value of the at least one metric is different from a current boundary value of the at least one metric updating metrics representative of the user profiles of the successful end users in the cohort of user profiles to adapt the coaching mechanism.

2. The method of claim 1, further comprising:
    analyzing, by the analysis engine, the information against a further metric; and
    generating, by the rules engine, a further coaching message for graphical output to the endpoint associated with the user profile if the information does not meet the further metric, wherein the further coaching message provokes a further change the user profile on the online dating system and/or user activity of the user profile on the online dating system to meet the further metric.

3. The method according to claim 2, wherein:
the at least one metric and the further metric are arranged according to the arrangement of metrics in the logical hierarchy of metrics; and
the respective analyzing and generating steps for the at least one metric and the further metric are performed in an order according to the logical hierarchy of metrics.

4. The method according to claim 3, wherein:
the coaching message and the further coaching message are stored in a queue of coaching messages; and
the coaching messages in the queue are provided as output to the endpoint associated with the user profile in an order provided by the queue.

5. The method according to claim 1, further comprising:
analyzing, by the analysis engine, the information against one or more metrics according to a predetermined schedule, or upon one or more changes to the user profile and/or user activity of the user profile.

6. The method according to claim 1, wherein the coaching message comprises a user interface part that the endpoint can act upon to perform an action which changes the user profile on the online dating system and/or the user activity of the user profile on the online dating system to meet the at least one metric.

7. The method according to claim 1, wherein the current boundary value is used to determine whether the information related to a user profile of a particular end user meets the at least one metric or does not meet the at least one metric.

8. The method of claim 1, wherein the successful end users maintain communications with other end users.

9. One or more non-transitory computer-readable media that includes code for execution and when executed by a processor is operable to perform operations for improving an online dating system and utilization thereof through a coaching mechanism, the operations comprising:
collecting information related to a user profile, wherein the user profile belongs to a cohort of user profiles of a plurality of cohorts of user profiles, wherein each of the plurality of cohorts of user profiles is defined by one or more of the following: sex, age, geographic area, ethnicity, and cultural background;
identifying a logical hierarchy of metrics corresponding to the cohort of user profiles, wherein each metric in the logical hierarchy of metrics indicates a characteristic statistically representative of user profiles of successful end users in the cohort of user profiles, and wherein the logical hierarchy of metrics comprises an arrangement of metrics that is unique to the cohort of user profiles and is different from arrangements of metrics others of the plurality of cohorts of user profiles;
analyzing the information against at least one metric, wherein the at least one metric is selected based on the logical hierarchy of metrics;
generating a coaching message for graphical output to an endpoint associated with the user profile if the information does not meet the at least one metric, wherein the user profile on the online dating system is changed to meet the at least one metric without receiving an input, via the coaching message, accepting the coaching message and the coaching message notifies the endpoint of the changing of to the user profile on the online dating system to meet the at least one metric; and
calculating an updated boundary value of the at least one metric based on changes in user profiles of the cohort of user profiles, when it is determined that the updated boundary value of the at least one metric is different from a current boundary value of the at least one metric updating metrics representative of the user profiles of the successful end users in the cohort of user profiles to adapt the coaching mechanism.

10. The one or more non-transitory computer-readable media of claim 9, wherein the operations further comprises:
analyzing the information against a further metric; and
generating a further coaching message for graphical output to the endpoint associated with the user profile if the information does not meet the further metric, wherein the further coaching message provokes a further change the user profile on the online dating system and/or user activity of the user profile on the online dating system to meet the further metric.

11. The one or more non-transitory computer-readable media according to claim 10, wherein:
the at least one metric and the further metric are arranged according to the arrangement of metrics in the logical hierarchy of metrics; and
the respective analyzing and generating steps for the at least one metric and the further metric are performed in an order according to the logical hierarchy of metrics.

12. The one or more non-transitory computer-readable media according to claim 11, wherein
the coaching message and the further coaching message are stored in a queue of coaching messages; and
the coaching messages in the queue are provided as output to the endpoint associated with the user profile in an order provided by the queue.

13. The one or more non-transitory computer-readable media according to claim 9, wherein the operations further comprises:
analyzing the information against one or more metrics according to a predetermined schedule, or upon one or more changes to the user profile and/or user activity of the user profile.

14. The one or more non-transitory computer-readable media according to claim 9, wherein the coaching message comprises a user interface element that the endpoint can act upon to perform an action which changes the user profile on the online dating system and/or the user activity of the user profile on the online dating system to meet the at least one metric.

15. A server comprising:
a memory configured to collect information related to a user profile, wherein the user profile belongs to a cohort of user profiles of a plurality of cohorts of user profiles, wherein each of the plurality of cohorts of user profiles is defined by one or more of the following: sex, age, geographic area, ethnicity, and cultural background; and
one or more processors configured to:
identify a logical hierarchy of metrics corresponding to the cohort of user profiles, wherein each metric in the logical hierarchy of metrics indicates a characteristic statistically representative of user profiles of successful end users in the cohort of user profiles, and wherein the logical hierarchy of metrics comprises an arrangement of metrics that is unique to the cohort of user profiles and is different from arrangements of metrics others of the plurality of cohorts of user profiles;

analyze the information against at least one metric, wherein the at least one metric is selected based on the logical hierarchy of metrics;

generate a coaching message for graphical output to an endpoint associated with the user profile if the information does not meet the at least one metric, wherein the user profile on the online dating system is changed to meet the at least one metric without receiving an input, via the coaching message, accepting the coaching message and the coaching message notifies the endpoint of the changing of the user profile of the end user on the online dating system to meet the at least one metric; and calculating an updated boundary value of the at least one metric based on changes in user profiles of the cohort of user profiles, when it is determined that the updated boundary value of the at least one metric is different from a current boundary value of the at least one metric update metrics representative of the user profiles of the successful end users in the cohort of user profiles to adapt the coaching mechanism.

16. The server according to claim 15, wherein:

the analysis engine is further configured to analyze the information against a further metric; and the rules engine is further configured to generate a further coaching message for graphical output to the endpoint associated with the user profile if the information does not meet the further metric, wherein the further coaching message provokes a further change the user profile on the online dating system and/or user activity of the user profile on the online dating system to meet the further metric.

17. The server according to claim 16, wherein:

the at least one metric and the further metric are arranged according to the arrangement of metrics in the logical hierarchy of metrics; and the respective analyzing and generating steps for the at least one metric and the further metric are performed in an order according to the logical hierarchy of metrics.

18. The server according to claim 15, wherein:

the coaching message and the further coaching message are stored in a queue of coaching messages; and the coaching messages in the queue are provided as output to the endpoint associated with the user profile in an order provided by the queue.

19. The server according to claim 15, wherein the analysis engine is further configured to analyze the information against one or more metrics according to a predetermined schedule, or upon one or more changes to the user profile and/or user activity of the user profile.

20. The server according to claim 15, wherein the coaching message comprises a user interface element that the endpoint can act upon to perform an action which changes the user profile on the online dating system and/or the user activity of the user profile on the online dating system to meet the at least one metric.

* * * * *